(12) United States Patent
Prohaszka et al.

(10) Patent No.: US 10,781,594 B2
(45) Date of Patent: Sep. 22, 2020

(54) RETRACTABLE AWNING CONTROL

(71) Applicant: Lippert Components Inc., Elkhart, IN (US)

(72) Inventors: Thomas Herman Prohaszka, Armada, MI (US); Kenneth Alan Higbee, Bloomfield Hills, MI (US); David James Cattermole, Oakland Township, MI (US); John Peter Manfreda, St. Clair Shores, MI (US)

(73) Assignee: LIPPERT COMPONENTS INC., Mishawaka, IN (US)

( * ) Notice: Subject to any disclaimer, the term of this patent is extended or adjusted under 35 U.S.C. 154(b) by 89 days.

(21) Appl. No.: 16/124,709

(22) Filed: Sep. 7, 2018

(65) Prior Publication Data

US 2019/0071877 A1    Mar. 7, 2019

Related U.S. Application Data

(60) Provisional application No. 62/555,244, filed on Sep. 7, 2017.

(51) Int. Cl.
*E04F 10/06* (2006.01)
*E04H 15/08* (2006.01)
(Continued)

(52) U.S. Cl.
CPC .......... *E04F 10/0659* (2013.01); *E04F 10/06* (2013.01); *E04F 10/0614* (2013.01);
(Continued)

(58) Field of Classification Search
CPC .. E04F 10/0659; E04F 10/06; G05B 19/0428; G05B 2219/24024; E04H 15/08;
(Continued)

(56) References Cited

U.S. PATENT DOCUMENTS 5,225,748 A    7/1993    Haring
5,307,856 A    5/1994    Murray
(Continued)

FOREIGN PATENT DOCUMENTS

EP    1659256 A2    5/2006
EP    2003264 A2    12/2008

OTHER PUBLICATIONS

Keystone RV Forums > Keystone Fleet I Keystone RV Models > Travel Trailers. Forum Discussion: How should Solera awning roll up? Retrieved from http://www.keystoneforums.com/forums/showthread.php?p=211906.
(Continued)

*Primary Examiner* — Bickey Dhakal
(74) *Attorney, Agent, or Firm* — Reising Ethington P.C.

(57) ABSTRACT

A method and device for halting the extension or retraction of a retractable awning comprises a sensor coupled to a processor that commands awning extension and retraction. The sensor senses a motion parameter, such as acceleration, which is associated with extension or retraction motion of a retractable awning and generates corresponding respective extension or retraction motion parameter signals. The processor calculates an acceleration rate of change and/or a tilt angle from the motion parameter signals received from the sensor, and halts awning extension or retraction by generating and sending a stop signal when the acceleration rate of change or tilt angle meets at least one predetermined criterion.

19 Claims, 5 Drawing Sheets

(51) Int. Cl.
  *G05B 19/042* (2006.01)
  *E06B 9/68* (2006.01)
(52) U.S. Cl.
  CPC ......... *E04H 15/08* (2013.01); *G05B 19/0428* (2013.01); *E06B 2009/6818* (2013.01); *G05B 2219/24024* (2013.01)
(58) Field of Classification Search
  CPC .. E06B 2009/6818; G01P 13/04; G01P 15/14; G06F 3/00; G06F 12/06; H02P 1/04
  See application file for complete search history.

(56) References Cited

U.S. PATENT DOCUMENTS

| | | |
|---|---|---|
| 6,798,158 B2 | 9/2004 | Evans |
| 7,152,652 B2 | 12/2006 | Heitel |
| 7,242,162 B2 | 7/2007 | Goth |
| 7,777,637 B2 | 8/2010 | Grehant |
| 7,828,036 B2 | 11/2010 | Tran |
| 8,050,885 B2 * | 11/2011 | Lapierre ............ E04F 10/0659 702/127 |
| 8,281,795 B2 | 10/2012 | Cutler |
| 8,692,498 B2 * | 4/2014 | Feldstein ................ E06B 9/42 318/470 |
| 8,887,785 B2 | 11/2014 | Goth |
| 2004/0159407 A1 * | 8/2004 | Girard ................ E04F 10/0648 160/66 |
| 2006/0113936 A1 * | 6/2006 | Goth .................. E04F 10/0659 318/280 |
| 2011/0048651 A1 | 3/2011 | Goth |
| 2011/0265958 A1 * | 11/2011 | Skinner .................. E06B 9/322 160/127 |
| 2012/0298315 A1 | 11/2012 | Marquez et al. |
| 2016/0338457 A1 | 11/2016 | Gharabegian |
| 2019/0024452 A1 * | 1/2019 | Derk, Jr. .................. E06B 9/42 |

OTHER PUBLICATIONS

European Search Report for EP Pat. App. No. 18193279.9, dated Feb. 11, 2019.

* cited by examiner

RETRACTABLE AWNING CONTROL

This is a U.S. non-provisional patent application claiming the benefit of priority from U.S. provisional patent application No. 62/555,244 filed on Sep. 7, 2017, the entire contents of which are incorporated herein.

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND

Field

This application relates generally to a device and method for halting extension of a retractable awning at a desired degree of extension.

Description of Related Art Including Information Disclosed Under 37 CFR 1.97 and 1.98

Several known types of retractable awnings include control systems to prevent overextension. For example, a spool-type retractable awning extends by unrolling a spool of awning fabric, but begins to roll back on itself if not stopped at full extension. This presents an automation challenge, because the spool in a spool-type retractable awning does not reach an easily detectable stop when the awning reaches full extension. The spool just keeps turning and starts rolling the awning back up. It's beneficial, therefore, for automated awning extension systems to incorporate some way of determining when an awning has been extended a desired amount, so that a stop command can be sent at or just before the point when an awning reaches desired extension.

SUMMARY

A device for halting the extension or retraction of a retractable awning is provided. The device comprises a sensor and a processor. The sensor is configured and positionable to sense a motion parameter associated with extension or retraction motion of a retractable awning and to generate corresponding respective extension or retraction motion parameter signals. The processor is coupled to the sensor and configured to calculate an acceleration rate of change in response to the motion parameter signals, and to generate a stop signal when the acceleration rate of change meets at least one predetermined criterion. The processor of the device may also, or alternatively, be configured to calculate an awning portion tilt angle from the motion parameter signals, and generate the stop signal when the awning portion tilt angle meets a predetermined criterion.

A method of halting retractable awning extension or retraction is also provided. The method comprises the steps of determining an acceleration rate of change along an axis of a selected portion of a retractable awning, and halting awning extension when the selected awning portion acceleration rate of change meets at least one predetermined criterion.

DRAWING DESCRIPTIONS

These and other features and advantages will become apparent to those skilled in the art in connection with the following detailed description and appended drawings, in which.

DETAILED DESCRIPTION

Figure 1:
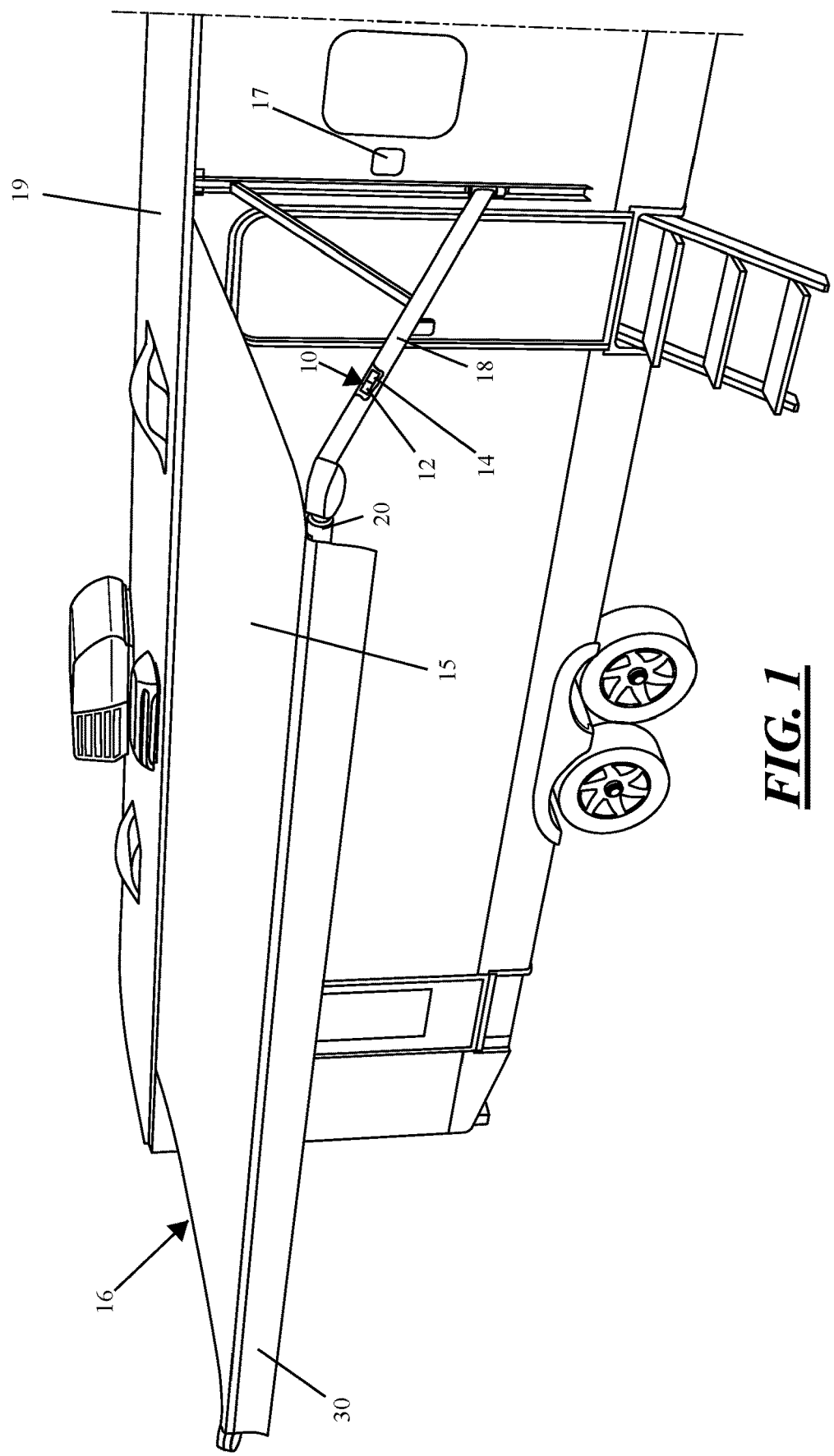
FIG. 1 is a partial-cutaway perspective view of a device for halting extension of a retractable awning, with the device shown installed on a support arm of a retractable awning carried by a vehicle.
Figure 2:
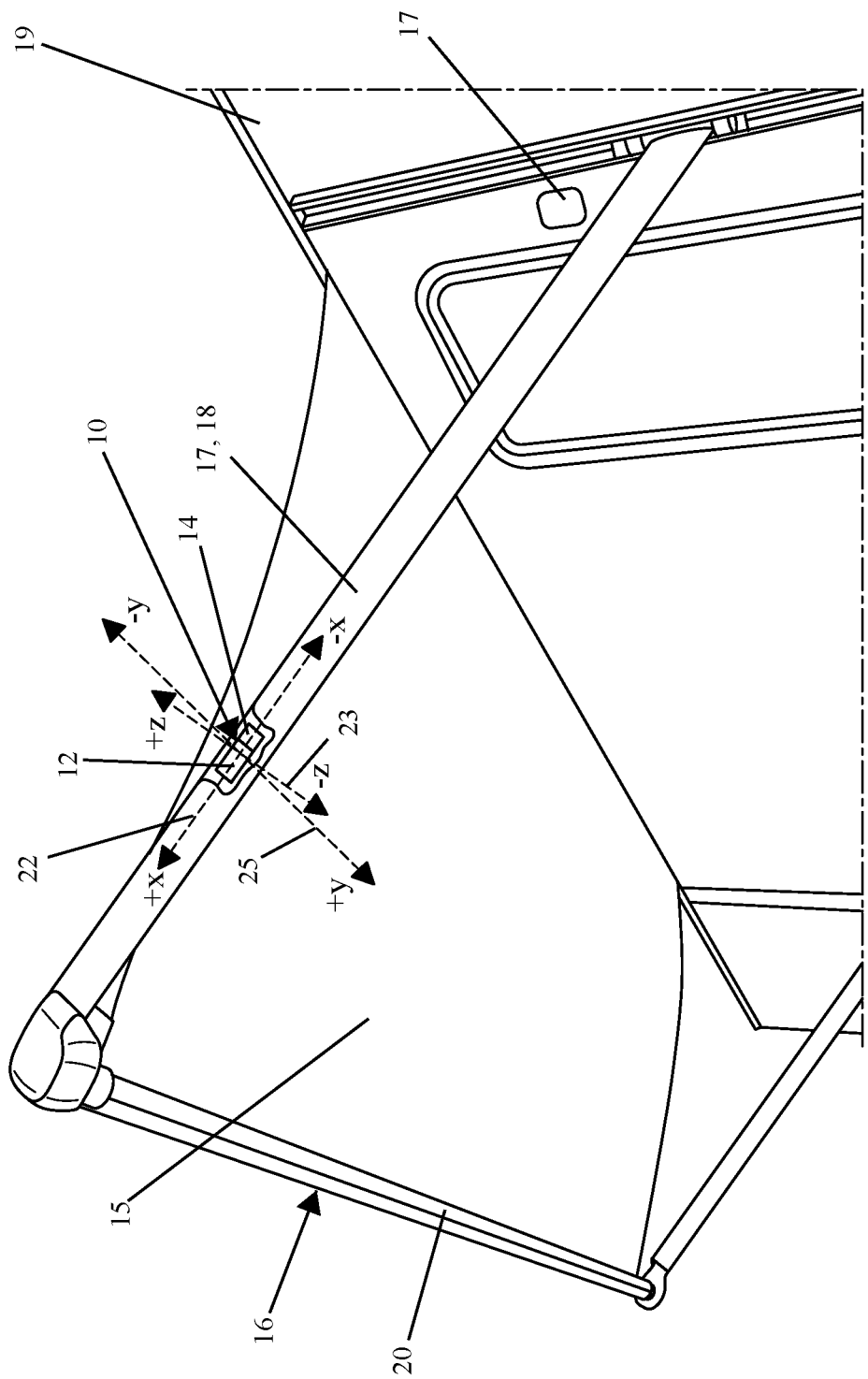
FIG. 2 is a magnified partial-cutaway perspective view of the device of FIG. 1 installed on a support arm of a retractable awning.
Figure 3:
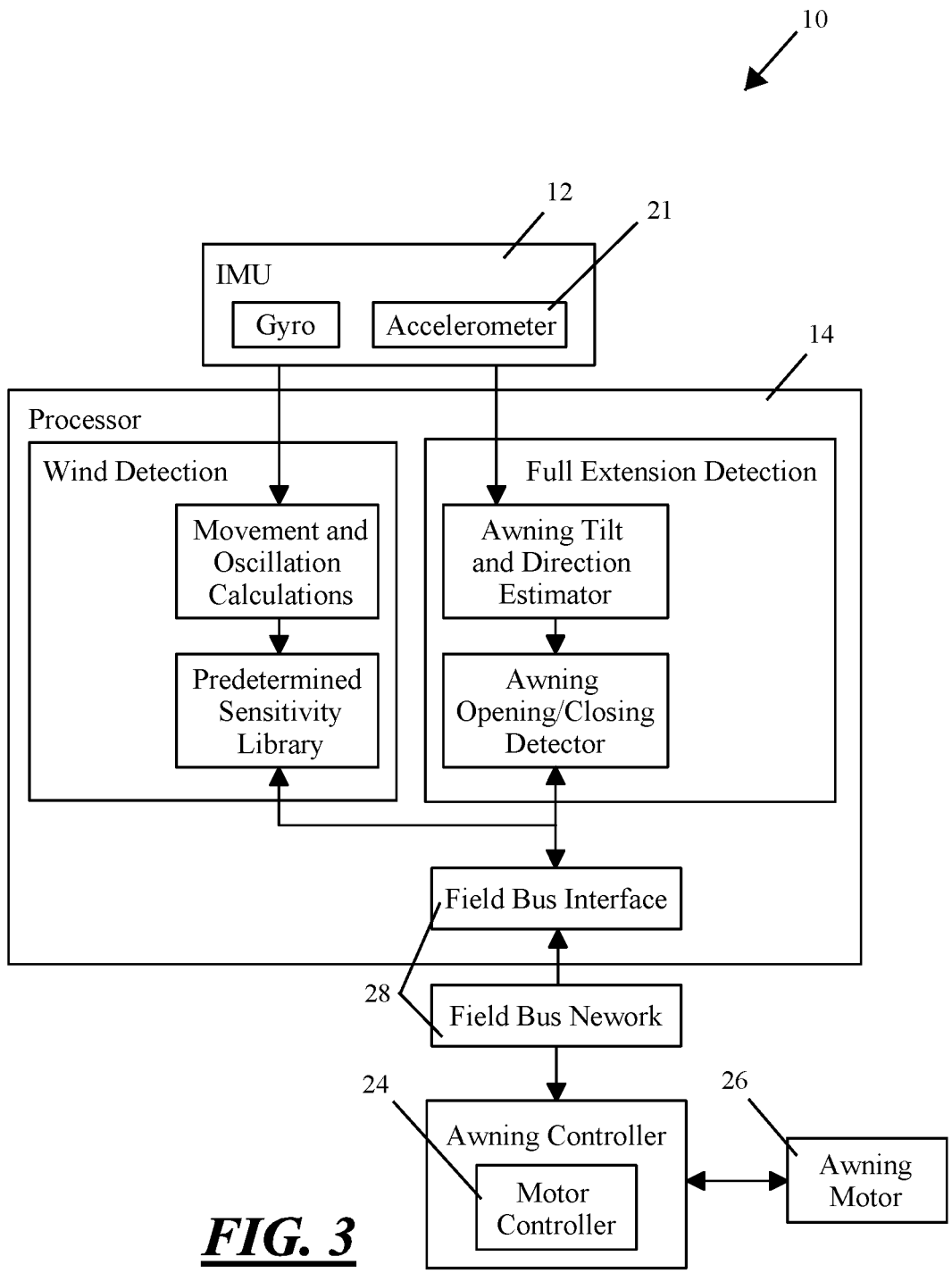
FIG. 3 is a block diagram of the device of FIG. 1.

A device for halting the extension of a retractable awning at a point where the awning is at or near full extension, and for halting the retraction of a retractable awning at a point where the awning is at or near full retraction, is generally shown at 10 in FIGS. 1-3. As shown in FIG. 3, the device 10 may comprise a motion parameter sensor 12 connected to a processor 14 that commands a halt to awning extension when motion parameter signals received from the sensor 12 meet one or more criteria, and commands a halt to awning retraction when motion parameter signals received from the sensor 12 meet one or more criteria.

The sensor 12 may be configured and positioned to sense a motion parameter associated with an extension motion parameter, i.e., a motion parameter associated with extension of a retractable awning 16. The sensor 12 may also be configured to generate and send corresponding extension motion parameter signals to the processor 14. The sensor 12 may also or alternatively be configured and positioned to sense a motion parameter associated with a retraction motion parameter, i.e., a motion parameter associated with retraction of a retractable awning 16, and to generate and send corresponding retraction motion parameter signals to the processor 14.

As shown in FIGS. 1 and 2, the sensor 12 may be positioned on or carried by a portion, such as a support arm 18, of a spool-type retractable awning 16 (including a canopy 15 and a spool 20 rotatably connected to the awning support arm 18). The sensor 12 may be configured to sense a motion parameter associated with motion of the support arm 18 carrying the sensor 12. More specifically, the sensor 12 may be configured to sense the motion parameter during spool-type awning extension, and to generate corresponding support arm 18 extension motion parameter signals; and may also, or alternatively, be configured to sense the motion parameter during spool-type awning retraction, and to generate corresponding support arm 18 retraction motion parameter signals. However, in other embodiments, the sensor 12 may be carried by any object or portion of the awning 16, and positioned to sense and send signals related to any other portion of the awning 16.

As is also shown in FIGS. 1 and 2, the processor 14 and sensor 12 may be co-located and may be included in a single module. But in other embodiments the processor 14 may be mounted separately from the sensor 12. For example, the processor 14 may be included in a control panel 17 that may be mounted to an outer side wall of a recreational vehicle 19 upon which the retractable awning 16 is mounted, or in any suitable type of control module in any location that allows the processor 14 to receive signals from the movement detection sensor 12 and successfully command awning extension and/or retraction.

As shown in FIG. 3, the sensor 12 may comprise an accelerometer 21. Where the sensor 12 comprises an accelerometer 21, it senses support arm (or other selected awning portion) acceleration along at least one support arm axis 22 and generates corresponding support arm (or awning portion) acceleration signals.

As is also shown in FIG. 3, the processor 14 may be coupled to the sensor 12 and may be programmed to calculate an acceleration rate of change in response to the extension and/or retraction motion parameter signals. Where, for example, the sensor 12 comprises an accelerometer 21 and is carried by an awning support arm 18 as shown in FIGS. 1 and 2, the processor 14 may be programmed to calculate an acceleration rate of change of the awning support arm 18 in response to the support arm 18 extension and/or retraction motion parameter (e.g., acceleration) signals received from the sensor 12. The processor 14 may also be programmed to generate a stop signal when the acceleration rate of change meets at least one predetermined criterion such as, for example, falling within a range of acceptable acceleration rate of change values.

The at least one predetermined criterion used by the processor 14 to determine whether an extension stop signal should be generated, may include a predetermined acceleration rate of change value associated with an awning position at or near full extension. However, the processor 14 may also be programmed to consider additional criteria in determining whether to halt awning extension. For example, the processor 14 may be programmed to generate the stop signal based upon a processor determination that the awning 16 is extending, and also that the awning support arm 18 acceleration rate of change meets the at least one predetermined criterion. To accomplish this end, the processor 14 may also be programmed to determine whether the awning 16 is extending rather than retracting, based on the extension motion parameter signals.

The at least one predetermined criterion used by the processor 14 to determine whether a retraction stop signal should be generated, may include a predetermined acceleration rate of change value associated with an awning position at or near full retraction. However, the processor 14 may also be programmed to consider additional criteria in determining whether to halt awning retraction. For example, the processor 14 may be programmed to generate the stop signal based upon a processor determination that the awning 16 is retracting, and also that the awning support arm 18 acceleration rate of change meets the at least one predetermined criterion. To accomplish this, the processor 14 may also be programmed to determine whether the awning 16 is retracting rather than extending, based on the retraction motion parameter signals.

Alternatively, or in addition, the processor 14 may be programmed to generate the extension stop signal when, in addition to the acceleration rate of change meeting at least one predetermined criterion, the awning portion tilt angle meets a predetermined criterion—such as falling within a range of acceptable tilt angle values associated with full awning extension. Where this is the case, the processor 14 may be programmed to calculate an awning portion tilt angle from the extension motion parameter signals. Similarly, the processor 14 may be programmed to generate the retraction stop signal when, in addition to the acceleration rate of change meeting at least one predetermined criterion, the awning portion tilt angle meets a predetermined criterion— such as falling within a range of acceptable tilt angle values associated with full awning retraction. Where this is the case, the processor 14 may be programmed to calculate an awning portion tilt angle from the retraction motion parameter signals.

Alternatively, or in addition, the processor 14 may be coupled to a motor power supply circuit (in, for example, the motor controller shown at 24 in FIG. 3) of an awning 16, to sense power drawn by an awning motor 26 that rotates the awning spool 20 upon which the awning canopy 15 is rolled during awning retraction and from which the canopy 15 is unrolled during awning extension. The processor 14 may be programmed to generate an extension stop signal when, in addition to the acceleration rate of change meeting at least one predetermined criterion, awning motor power draw meets a predetermined criterion—such as falling within a range of acceptable electrical power draw values, or falling within a range of acceptable power draw rate of change values associated with full awning extension. Preferably, the processor 14 may be programmed to generate an extension stop signal when the awning motor power draw rate of change is consistent with the awning canopy 15 having fully unrolled from the awning spool 20, and beginning to roll back onto the spool 20 in an "inside-out" orientation as the motor 26 continues to rotate the spool 20 in the same direction.

Likewise, the processor 14 may be programmed to generate a retraction stop signal when, in addition to the acceleration rate of change meeting at least one predetermined criterion, awning motor power draw meets a predetermined criterion—such as falling within a range of acceptable electrical power draw values associated with full awning retraction, or falling within a range of acceptable power draw rate of change values associated with full awning retraction.

As is also shown in FIG. 3, the processor 14 may include a filter that attenuates or removes noise from the extension and/or retraction motion parameter signals. For example, noise may be attenuated or removed from the extension and/or retraction motion parameter signals by applying a low pass filter to the motion parameter signals. Alternatively, or in addition, noise may be attenuated or removed from the motion parameter signals by applying a pass filter that passes desired motion parameter signals having a predetermined frequency or frequency range.

As is also shown in FIG. 3, the device 10 may include a field bus 28 for transmitting stop signals from the processor 14 to an awning motor 26. The field bus 28 may be configured to transmit stop signals from the processor 14 to an awning motor controller 24 that commands the awning motor 26 to halt awning extension or retraction in response to a stop signal received via the field bus 28.

Figure 4:
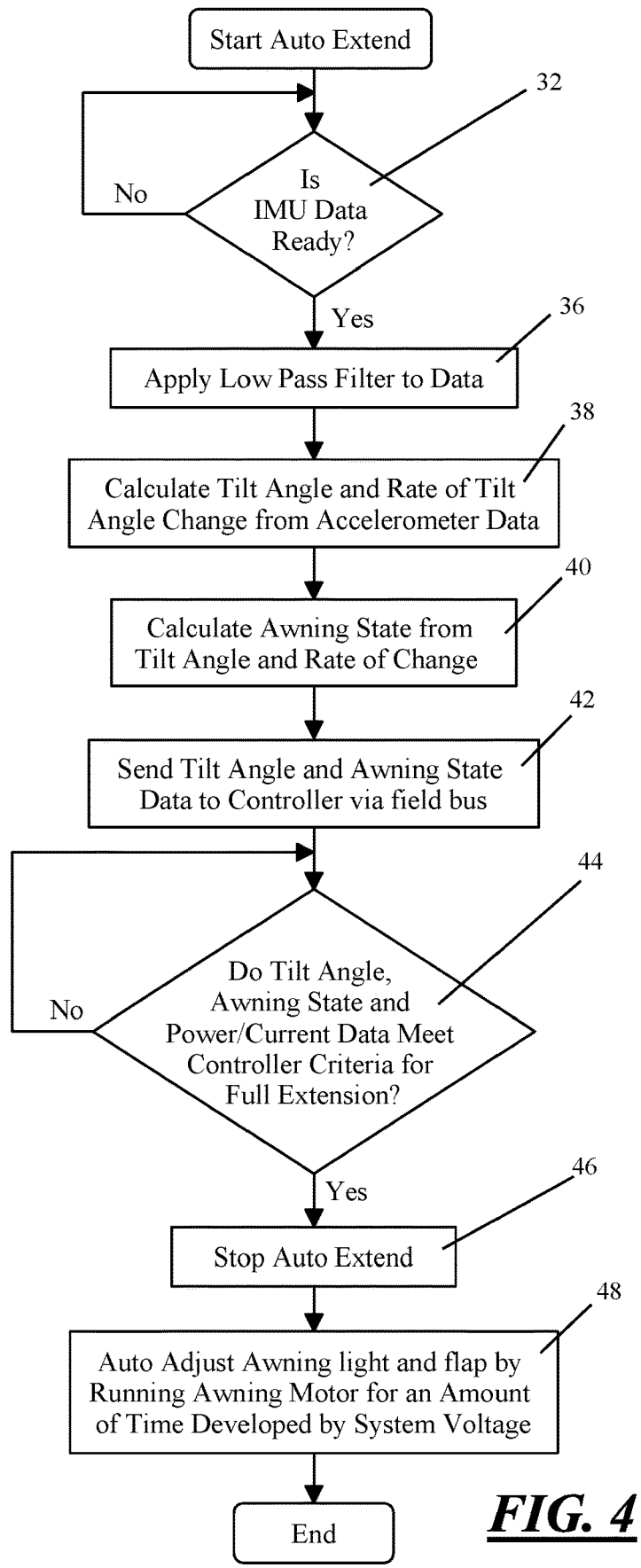
FIG. 4 is a flow chart showing a method for halting the extension of a retractable awning.

In practice, and as shown in FIG. 4, the extension of a retractable awning 16 may be halted at or near an awning extension limit by first confirming that the sensor 12 is ready (as shown at decision step 32), applying a low pass filter to the data generated by the sensor 12 (as indicated in action step 36), and then determining an acceleration rate of change (as shown in action step 38) along a z axis 23 of a selected portion of the awning 16, such as an awning support arm 18, of a retractable awning 16. Awning extension may then be halted (as shown in action step 46) when the acceleration rate of change of the selected awning portion meets at least one predetermined criterion (as shown in decision step 44)—such as falling within a range of awning portion acceleration values associated with reaching or being in a position near full awning extension.

Where the awning portion comprises a support arm 18, acceleration rate of change may be determined along a z axis 23 perpendicular to and vertically coplanar with a longitudinal x axis 25 of the support arm 18 of the awning 16. Change in acceleration may be measured along the z axis 23 over time, and then the measured change in acceleration may be divided by the time between measurements. In other words, rate of change=(Z−Zn)/delta time, where Z is present z axis sample, Zn is a previous z axis sample in time.

Awning extension may be halted when the selected awning portion acceleration rate of change meets or exceeds a minimum predetermined value—such as a minimum acceleration value of the selected awning portion that may be associated with the awning 16 reaching full extension or a position near full extension.

As shown in action step 40 and decision step 44, the method may take into consideration a determination as to whether the awning 16 is extending. In that case, awning extension may be halted when, in addition to the acceleration rate of change meeting at least one predetermined criterion, the awning 16 has been determined to be extending.

As shown in action step 38 and decision step 44, the method may also, or alternatively, take into consideration a tilt angle of the selected portion of the awning 16, e.g., tilt angle relative to earth gravity level. In this case, awning extension may be halted when, in addition to the acceleration rate of change of the selected awning portion meeting at least one predetermined criterion, the tilt angle of the selected awning portion reaches a predetermined value.

Measurement of the tilt angle of the selected portion of the awning 16 may include measuring an x axis acceleration value along the x axis 25 of the selected portion of the retractable awning 16, i.e., a longitudinal axis of the support arm 18 of the awning 16, and also measuring a z axis acceleration value along a z axis 23 of the selected portion of the retractable awning 16, the z axis 23 being disposed at an angle greater than zero degrees, e.g., 90 degrees, relative to the x axis 25 and vertically coplanar with the x axis 25. Tilt angle of the selected awning portion is then calculated by taking the arc tangent of the quotient of x axis acceleration, divided by z axis acceleration.

In addition, or alternatively, a power draw characteristic of an awning motor 26 may be taken into-account in determining when an awning extension limit is near or has been reached, as shown in decision step 44. The halting of awning extension may be commanded when, in addition to the acceleration rate of change meeting the at least one predetermined criterion, the amount of power draw, or power draw rate of change of an awning motor 26 reaches a predetermined value, and the tilt angle of the selected awning portion meets at least one predetermined criterion.

If the awning 16 includes additional features such as a light or a flap 30, the awning 16 may need to be retracted slightly from full extension to properly position these additional features, as shown in action step 48. After halting, the awning 16 may remain stopped for a predetermined amount of time to allow the awning 16 to settle. Then the awning 16 may be retracted for a predetermined amount of time that varies according to the system voltage. For example, an awning motor 26 running at a relatively low voltage would need to run longer to properly position a flap 30 compared to a motor 26 running at a higher voltage.

Figure 5:
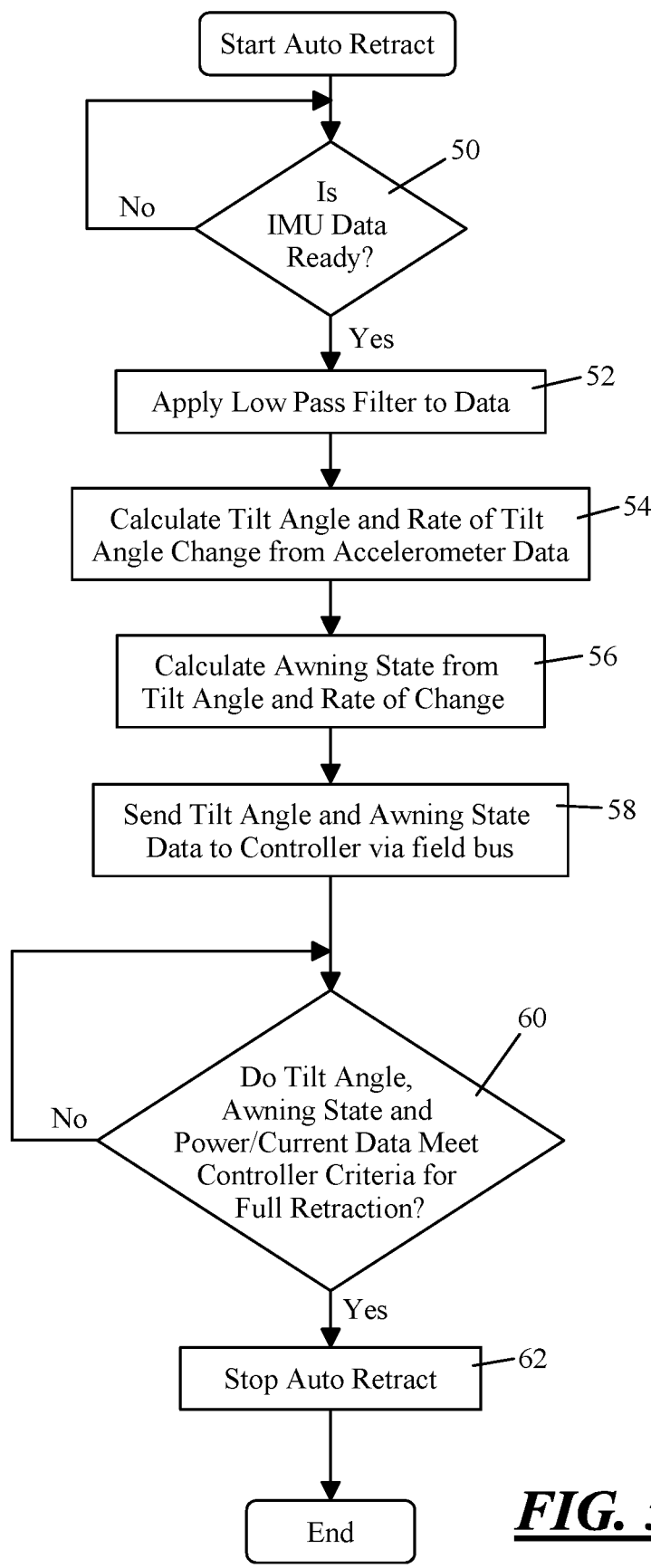
FIG. 5 is a flow chart showing a method for halting the retraction of a retractable awning.

As shown in FIG. 5, retraction of a retractable awning 16 may be halted at or near an awning retraction limit by first confirming that the sensor 12 is ready (as shown at decision step 50), applying a low pass filter to the data generated by the sensor 12 (as indicated in action step 52), and then determining an acceleration rate of change (as shown in action step 54) along the z axis 23 of the selected awning portion, e.g., the awning support arm 18. Awning retraction may then be halted (as shown in action step 62) when the acceleration rate of change of the selected awning portion 18 meets at least one predetermined criterion (as shown in decision step 60)—such as falling within a range of awning portion acceleration values associated with reaching full awning retraction or a position near full retraction.

Where the awning portion comprises a support arm 18, acceleration rate of change may be determined along a z axis 23 perpendicular to and vertically coplanar with a longitudinal x axis 25 of the support arm 18 of the awning 16. Change in acceleration may be measured along the z axis 23 over time, and then the measured change in acceleration may be divided by the time between measurements. In other words, rate of change=(Z−Zn)/delta time, where Z is present z axis sample, Zn is a previous z axis sample in time.

Awning retraction may be halted when the selected awning portion acceleration rate of change meets or exceeds a minimum predetermined value—such as a minimum acceleration value of the selected awning portion that may be associated with the awning 16 reaching full retraction or a position near full retraction.

As shown in action step 56 and decision step 60, the method may take into consideration a determination as to whether the awning 16 is retracting. In that case, awning retraction may be halted when, in addition to the acceleration rate of change meeting at least one predetermined criterion, the awning 16 has been determined or confirmed to be retracting rather than extending.

As shown in action step 54 and decision step 60, the method may also, or alternatively, take into consideration a tilt angle of the selected portion of the awning 16, e.g., tilt angle relative to earth gravity level. In this case, awning retraction may be halted when, in addition to the acceleration rate of change of the selected awning portion meeting at least one predetermined criterion, the tilt angle of the selected awning portion reaches a predetermined value.

Measurement of the tilt angle of the selected portion of the awning 16 may include measuring an x axis acceleration value along the x axis 25 of the selected portion of the retractable awning 16, i.e., a longitudinal axis of the support arm 18 of the awning 16, and also measuring a z axis acceleration value along a z axis 23 of the selected portion of the retractable awning 16; the z axis 23 being disposed at an angle greater than zero degrees, e.g., 90 degrees, relative to the x axis 25 and vertically coplanar with the x axis 25. Tilt angle of the selected awning portion is then calculated by taking the arc tangent of the quotient of x axis acceleration, divided by z axis acceleration.

In addition, or alternatively, characteristics of the power draw of an awning motor 26 may be taken into-account in determining when an awning is near or has reached an extension limit, as shown in decision step 60. The halting of awning retraction may be commanded when, in addition to the acceleration rate of change meeting the at least one predetermined criterion, the amount of power drawn by an awning motor 26, or the power draw rate of change of the motor 26, reaches a predetermined value and the tilt angle of the selected awning portion meets at least one predetermined criterion.

A retractable awning extension and/or retraction device constructed as described above, and operated according to the methods described above, may be accurately and automatically halted at full extension and/or retraction. The invention allows this task to be performed efficiently with only input from a single movement sensor such as an accelerometer.

This description, rather than describing limitations of an invention, only illustrates embodiments of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. A device for halting the extension or retraction of a retractable awning, the device comprising:
   a sensor configured and positionable to sense a motion parameter associated with extension or retraction motion of a retractable awning and to generate corresponding respective extension or retraction motion parameter signals; and
   a processor coupled to the sensor and configured to:
   calculate an acceleration rate of change in response to the extension or retraction motion parameter signals, the acceleration rate of change equaling the quotient of a measured change in acceleration over time, divided by time between measurements, and
   generate a stop signal when the acceleration rate of change meets at least one predetermined criterion that corresponds to a desired state of awning extension or retraction.

2. The device of claim 1 in which:
   the sensor is configured to be carried by and sense a motion parameter associated with extension or retraction motion of a support arm of a spool-type retractable awning during spool-type awning extension, and to generate corresponding respective support arm extension or retraction motion parameter signals; and
   the processor is configured to calculate acceleration rate of change in response to support arm extension or retraction motion parameter signals received from the sensor.

3. The device of claim 2 in which:
   the sensor comprises an accelerometer configured to sense support arm acceleration along at least one support arm axis, and is configured to generate corresponding support arm acceleration signals; and
   the processor is configured to calculate an awning support arm acceleration rate of change in response to the support arm acceleration signals received form the sensor.

4. The device of claim 2 in which the processor includes a low pass filter configured to remove noise from the motion parameter signals.

5. The device of claim 1 in which the at least one predetermined criterion includes a predetermined acceleration rate of change value associated with an awning position at or near full extension.

6. The device of claim 1 in which the processor is configured to:
   determine whether the awning is extending or retracting, based on the motion parameter signals, and
   generate the stop signal based upon a processor determination that:
   the awning is extending and the awning portion acceleration rate of change meets the at least one predetermined criterion associated with extension termination; or
   the awning is retracting and the awning portion acceleration rate of change meets at least one predetermined criterion associated with retraction termination.

7. The device of claim 1 in which the processor is configured to:
   calculate an awning portion tilt angle from the motion parameter signals, and
   generate the stop signal when, in addition to the acceleration rate of change meeting at least one predetermined criterion, the awning portion tilt angle meets a predetermined criterion.

8. The device of claim 1 in which the processor is:
   couplable to a motor power supply circuit of an awning to sense awning motor power draw; and
   configured to generate the stop signal when, in addition to the acceleration rate of change meeting at least one predetermined criterion, awning motor power draw meets a predetermined criterion.

9. The device of claim 8 in which the predetermined criterion for awning motor power draw is a motor power draw rate of change consistent with an awning canopy having fully unrolled from an awning spool and beginning to roll back onto the spool as the motor continues to rotate the spool.

10. The device of claim 1 in which a field bus is configured to transmit stop signals from the processor to an awning motor controller that commands an awning retractor motor to halt awning extension or retraction in response to a stop signal received via the field bus.

11. A device for halting the extension or retraction of a retractable awning, the device comprising:
    a sensor configured and positionable to sense a motion parameter associated with extension or retraction motion of a retractable awning and to generate corresponding respective extension or retraction motion parameter signals; and
    a processor coupled to the sensor and configured to:
    calculate an acceleration rate of change in response to the extension or retraction motion parameter signals, the acceleration rate of change equaling the quotient of a measured change in acceleration over time, divided by time between measurements,
    calculate an awning portion tilt angle from the motion parameter signals, and
    generate the stop signal when the acceleration rate of change of selected awning portion meets a predetermined criterion and the awning portion tilt angle meets a predetermined criterion.

12. The device of claim 11 in which the sensor comprises an accelerometer configured to sense acceleration as the motion parameter.

13. A method of halting retractable awning extension or retraction, the method comprising the steps of:
    determining an acceleration rate of change along an axis of a selected portion of a retractable awning by measuring a change in acceleration along the axis over a time and then dividing the measured change in acceleration by time between measurements; and
    halting the awning at a desired state of extension or retraction in response to a determination that the selected awning portion acceleration rate of change meets at least one predetermined criterion.

14. The method of claim 13 in which the halting step includes:

halting awning extension when the selected awning portion acceleration rate of change meets or exceeds a minimum predetermined value associated with full awning extension.

halting awning retraction when the selected awning portion acceleration rate of change meets or exceeds a minimum predetermined value associated with full awning retraction.

15. The method of claim 13 in which the determining step includes determining acceleration rate of change along an axis perpendicular to and vertically coplanar with a longitudinal axis of the support arm of the awning.

16. The method of claim 13 in which:
the method includes the additional step of determining whether the awning is extending or retracting; and
the step of halting awning extension or retraction includes:
halting awning extension when the awning is extending and the acceleration rate of change meets at least one predetermined criterion associated with awning full extension.
halting awning retraction when the awning is retracting and the acceleration rate of change meets at least one predetermined criterion associated with awning full retraction.

17. The method of claim 13 in which:
the method includes the additional step of calculating tilt angle of the selected portion of the awning, and
the step of halting awning extension or retraction includes halting awning extension when, in addition to the acceleration rate of change of the selected awning portion meeting at least one predetermined criterion, the tilt angle of the selected awning portion reaches a predetermined value.

18. The method of claim 17 in which the step of calculating a tilt angle of a selected portion of the awning includes:
measuring a first axis acceleration value along a first axis of the selected portion of the retractable awning;
measuring a second axis acceleration value along a second axis of the selected portion of the retractable awning, the second axis being disposed at an angle greater than zero degrees relative to the first axis; and
calculating tilt angle of the selected awning portion by taking the arc tangent of the quotient of first axis acceleration, divided by second axis acceleration.

19. The method of claim 13 in which:
the method includes the additional step of measuring power drawn by an awning motor; and
the step of halting awning extension or retraction includes halting awning extension or retraction when, in addition to the acceleration rate of change meeting the at least one predetermined criterion:
the amount of power drawn by an awning motor reaches a predetermined value; and
the selected awning portion tilt angle meets at least one predetermined criterion.

\* \* \* \* \*

UNITED STATES PATENT AND TRADEMARK OFFICE
CERTIFICATE OF CORRECTION

PATENT NO. : 10,781,594 B2
APPLICATION NO. : 16/124709
DATED : September 22, 2020
INVENTOR(S) : Thomas Herman Prohaszka et al.

It is certified that error appears in the above-identified patent and that said Letters Patent is hereby corrected as shown below:

In the Claims

Column 7, Line 49 Claim 3 -- delete "form" and insert --from--

Column 9, Line 4 Claim 14 -- delete "." and insert --;--

Column 9, Line 20 Claim 16 -- delete "." and insert --;--

Signed and Sealed this
Twenty-ninth Day of December, 2020

Andrei Iancu
*Director of the United States Patent and Trademark Office*